INVENTORS
WILLIAM W. HARDIN
JAMES J. KENNEDY

AGENT

United States Patent Office 3,396,276
Patented Aug. 6, 1968

3,396,276
DIRECTION DETECTOR FOR FLYING SPOT SCANNER WITH DIGITAL INDICATOR THEREFOR
William W. Hardin, Stewartville, and James J. Kennedy, Rochester, Minn., assignors to International Business Machines Corporation, Armonk, N.Y., a corporation of New York
Filed Jan. 5, 1966, Ser. No. 518,845
5 Claims. (Cl. 250—202)

This invention relates to direction detectors for flying spot scanners and particularly to an improved arrangement for determining the direction in which the scanning spot is moving in a curve following type of flying spot scanner. More particularly, the present invention relates to a unique arrangement for deriving analog values indicative of that portion of a circular scanning pattern which is being traversed by the spot in a flying spot scanner and combining the various analog signals in digital fashion to provide an indication of direction of the scanning spot of the flying spot scanner.

In flying spot scanners of the type in which curves, characters or other patterns are traced out by means of a scanning spot which is arranged to move in a circular pattern with the radius of the pattern being changed in accordance with the interception or non-interception of the pattern to be followed, it is usually necessary to provide some means of determining the general direction in which the scanning spot is progressing to provide information for decoding the characters or other patterns or for other purposes, such as for insuring that if the spot becomes "trapped" within a hollow space in the interior of a character or pattern, circuitry will be enabled which will cause the spot to be moved out of its trapped condition.

Accordingly, it is a principal object of the present invention to provide a simplified and improved form of direction detection means for determining the direction of the scanning spot in a flying spot scanner of the circle curve following type.

Still another object of the invention is to provide an improved form of direction detector for a flying spot scanner which utilizes the signals employed to generate the curve following pattern to also provide an indication of the direction of the spot motion.

Briefly described, the present invention contemplates the derivation of analog signals from the angularly related functions of a sinusoidal voltage utilized to generate the scanning pattern, namely the sine wave per se, the cosine wave and the negative cosine wave of the alternating current wave form which forms the basic source of the deflection voltages employed in generating the curve following circle type scanning pattern. The various voltages are derived by suitable phase shifting circuits, and after having been supplied through delay circuits to compensate for the inertias of the system are compared in comparator circuits in various combinations which are indicative of a plurality of semi-circular relations wth respect to the circle which would be described by the circle following scanner in response to the sine and cosine signals supplied thereto. Depending upon the output of the comparators, one or more of a plurality of trigger circuits are energized at sampling times determined by the intersection of the scanning beam with a portion of a character stroke, and at such time inputs are provided to a plurality of digital logic circuits the outputs of which will indicate the direction in which the spot is moving at the particular time. By considering that, for example, at the time of intersection in a circle following scanner the spot is moving in a direction which 90° previously represented the direction of motion of the circle centers, it will be apparent that the arrangement provides not only for detecting the current direction of travel of the scanning spot but can also provide a means for determining a direction of travel of the circle center.

The foregoing and other objects, features and advantages of the invention will be apparent from the following more particular description of a preferred embodiment of the invention, as illustrated in the accompanying drawings.

In the drawings:
FIG. 1 is a diagrammatic representation of a portion of a curve following character scanning system which includes a preferred embodiment of the present invention up to and including the digitalized outputs indicative of the current position of the scanning spot.

In the drawings, similar reference characters refer to similar parts in each of the several views.

Figure 1:
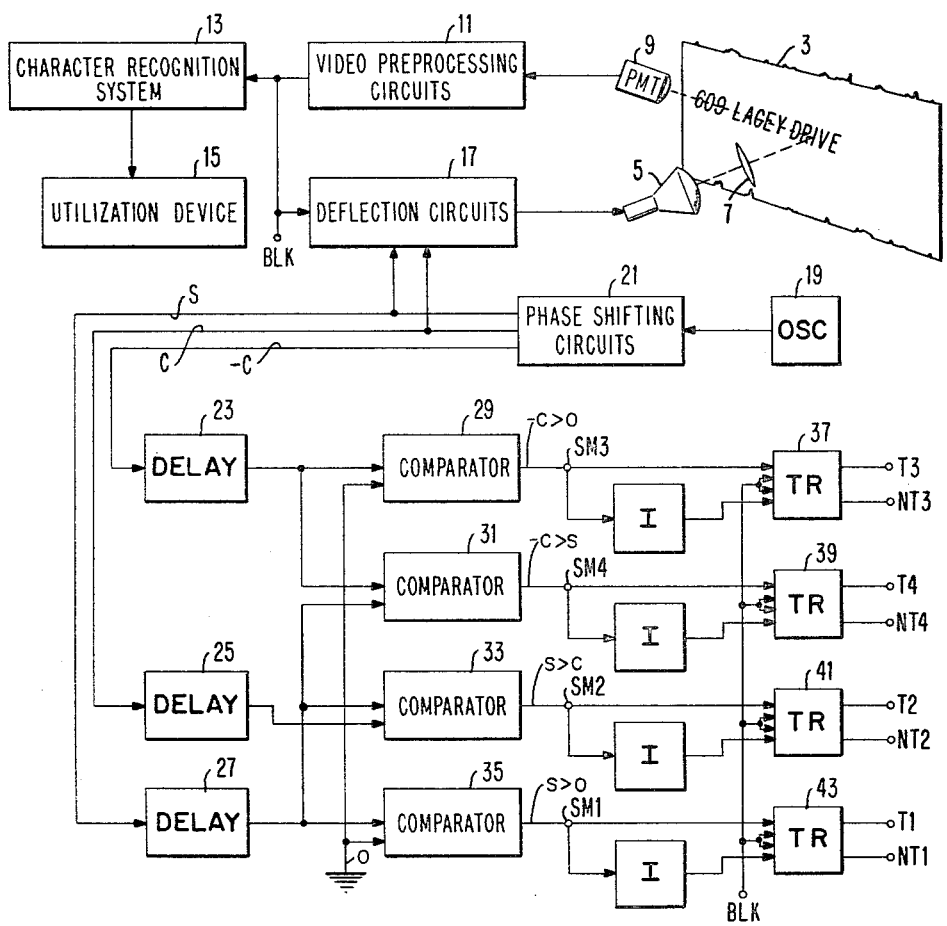

Referring to FIG. 1 of the drawings, the reference character 3 designates a document bearing characters which are to be analyzed by a character recognition system and supplied as output signals indicative of their value to a utilization device. The system is arranged to operate in connection with a flying spot scanner of the curve following type employing circular scans of varying radius. The system includes a cathode ray tube 5, an optical system designated generally by the reference character 7 which serves to focus the scanning pattern generated on the face of the cathode ray tube 5 on the document, a photomultiplier tube or other photo responsive device 9 arranged to translate the variations in light intensity into electrical impulses, video preprocessing circuits 11 which are arranged to quantize the signals supplied from the photomultiplier tube 9 so that the output of the video preprocessing circuits 11 constitutes binary valued pulses indicative of whether or not the scanning beam is encountering a portion of the character or the background.

The video signals are supplied to a character recognition system indicated generally by the block 13, the details of which are not shown since the actual form of the system is not germane to the present invention. Upon recognition of a particular character, an output indicative of the value of the character is supplied from the character recognition system 13 to any suitable type of utilization device 15. The output from video preprocessing circuits 11 is also supplied to a terminal BLK and to one input of deflection circuits 17 for governing the beam motion of the cathode ray tube 5. Deflection circuits 17 may include a plurality of the circuits which are known in the art and which may vary in accordance with the particular construction of the system. Suffice it to say that the system is arranged so that the cathode ray tube beam moves along the border of a character and is moved in a generally circular fashion, the radius of the circle being decreased each time that the beam encounters the edge of a character stroke. The beam radius is decreased for a predetermined portion of the circle frequency after which the radius is increased to the greater amount, thus causing the beam to execute a series of cycloidal type loops which effectively trace out the outline of the character or pattern.

To supply the signals necessary to cause a circular type beam deflection, an oscillator 19 provides a basic operating frequency, which is supplied to suitable phase shifting circuits 21 having three outputs therefrom, designated by the reference characters S, C, and —C. These outputs respectively are the sine wave corresponding to the output of the oscillator 19, the cosine wave derived from that sine wave, and the negative cosine wave also derived therefrom. To produce the circular deflection of the cathode ray tube beam, the sine and the cosine waves are supplied to the deflection circuits 17 and, as is well known in the art, when sine and cosine waves of the same wave form are provided to the orthogonal deflection system of a cathode ray tube, the resulting beam motion will be that of a circle. As previously pointed out, the deflection circuit 17 includes circuitry which cause an attenuation of the deflection signals of sine and cosine form during a time that the beam is moving within a character stroke width. On the other hand, when the beam is moving outside the character, the deflection voltages are increased both for the sine and cosine wave forms and therefore the radius of the scanning circle is increased.

Figure 2:
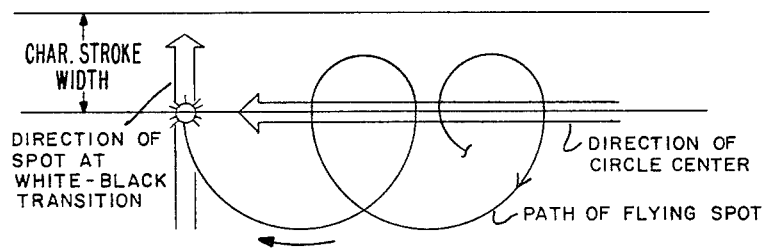
FIG. 2 is a diagrammatic illustration showing the path of travel of the spot and the circle centers with respect to a character stroke which is being followed by the curve following beam.

Such a scanning operation is illustrated in FIG. 2 of the drawings, in which the looping line shows the path traversed by the scanning spot, and the manner in which the radius changes as the scanning spot encounters the edge of the character stroke and leaves the edge of the character are clearly illustrated in this figure. It should be noted from this figure that at any given time as the scanning spot encounters the edge of the character, its direction of motion is 90° in advance relatively speaking with respect to the direction of motion of the scanning beam in toto or the scanning centers.

The present invention particularly relates to means for determining the direction of motion of the scanning spot at any given time. To provide such an indication, the sinusoidal signals S, C, and —C are fed through delay circuits 27, 25 and 23 respectively to compensate for spot inertia delays in deflection circuits 17 and the cathode ray tube 5, and these delayed outputs are supplied in various combinations with respect to each other and with respect to a reference potential, such as ground potential, to a plurality of comparator circuits, in this instance four in number. The output of these comparator circuits provides an indication of that semicircular portion of the circle in which the spot is travelling. By combining the outputs of the semicircular portions of the circle with suitable logic circuits, the actual direction of motion considered for example from the standpoint of compass directions can be narrowed down to relatively limited directions. It will be obvious that the degree of finess to which the direction can be determined may be either increased or decreased by providing a greater or lesser number of comparisons between the phase relationships of the signals involved in the generation of the scanning patterns.

Figure 4:
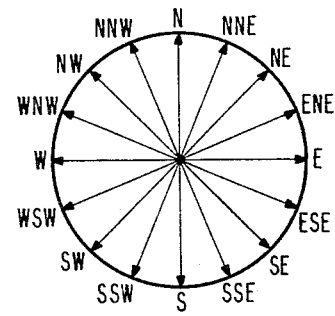
FIG. 4 is a diagrammatic illustration of the compass directions which, for the sake of simplicity, are utilized in designating the direction of travel of the scanning beam.

The first of the comparators, 29, compares the signal —C with respect to ground, and provides a first output designated as SM3 which may be considered to represent the semicircle which can be described in FIG. 4 as any direction from ESE to WNW. Comparator 31 compares the output of delay unit 23 with respect to the output of delay unit 27 and provides a signal SM4 which represents any direction from SSE to NNW with respect to the direction shown in FIG. 4. Comparator 33 provides an output SM2 as a result of comparing the outputs of delay units 25 and 27 and the output SM2 may be considered as representing any direction from ENE to WSW, FIG. 4. Comparator 35 compares the output of delay unit 27 and ground or reference potential, and the output SM1 thereof is considered as any direction from NNE to SSW as seen in FIG. 4. It is accordingly seen that the present arrangement provides four outputs indicating four semicircular portions of a complete circle extending from different points around the circumference of the circle, depending upon the location of the beam spot. The outputs SM1 through SM4 are supplied together with their inverted form to inputs of a corresponding plurality of triggers 37, 39, 41 and 43, corresponding respectively to the outputs SM3, SM4, SM2 and SM1. These triggers are constructed and arranged so that when and only when input signals are supplied to a pair of center terminals, the trigger will be turned on to one or the other of two output conditions in accordance with the inputs provided to the two outermost input terminals considered as being on the left-hand side. It will be noted that the common input to each of the four triggers is connected to the terminal BLK so that as a result the triggers will be operated to one or the other of their two states at the time that the scanning beam encounters a portion of the character and causes an output from the video preprocessing circuits 11.

Each of triggers 37, 39, 41 and 43 has two outputs, one of which may be considered as the positive or ON output and the other as the negative or OFF output, as for example, the outputs designated T1 and NT1 respectively for trigger 43. The output T1 being up or on would indicate that a video signal occurred during the time that the spot was moving in that semicircle designated as SM1, which as previously pointed out would be anywhere in the direction from NNE to SSW with reference to FIG. 4. The remaining triggers are arranged in similar fashion to provide either on or off outputs indicative of whether or not the scanning spot encountered a black area at that particular semi-circular portion of the circular scanning pattern designated by the appropriate input terminal SM2, SM3 or SM4.

Figure 3:
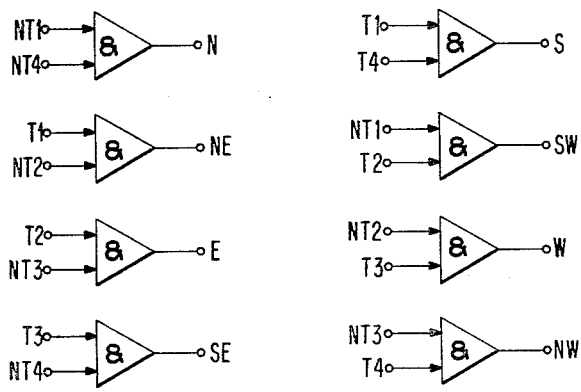
FIG. 3 is a diagrammatic illustration of an arrangement of logical circuits for indicating the direction of travel of the scanning beam in accordance with the outputs of the apparatus shown in FIG. 1.

As a result of the combination of the various possible logical combinations of outputs from the four triggers indicating the possible hemispherical locations in which the spot may occur, it is possible for example to derive output signals indicative of eight of the directions in which the spot will be travelling at any particular time with a predetermined tolerance. These arrangements are shown in FIG. 3 of the drawings and comprise eight AND circuits of conventional variety in which each of the AND circuits has two inputs thereto constituting various ones of the outputs of the four triggers, and the output of which is indicative then of the logical combination of the two semi-circular position indications. For example, if the trigger 43 is turned on so that an output T1 is provided and trigger 41 is triggered to its off position so that an output NT2 is provided, then an AND circuit will be enabled which will provide an output designated as NE indicating that the direction of travel is northeast.

Figure 5:
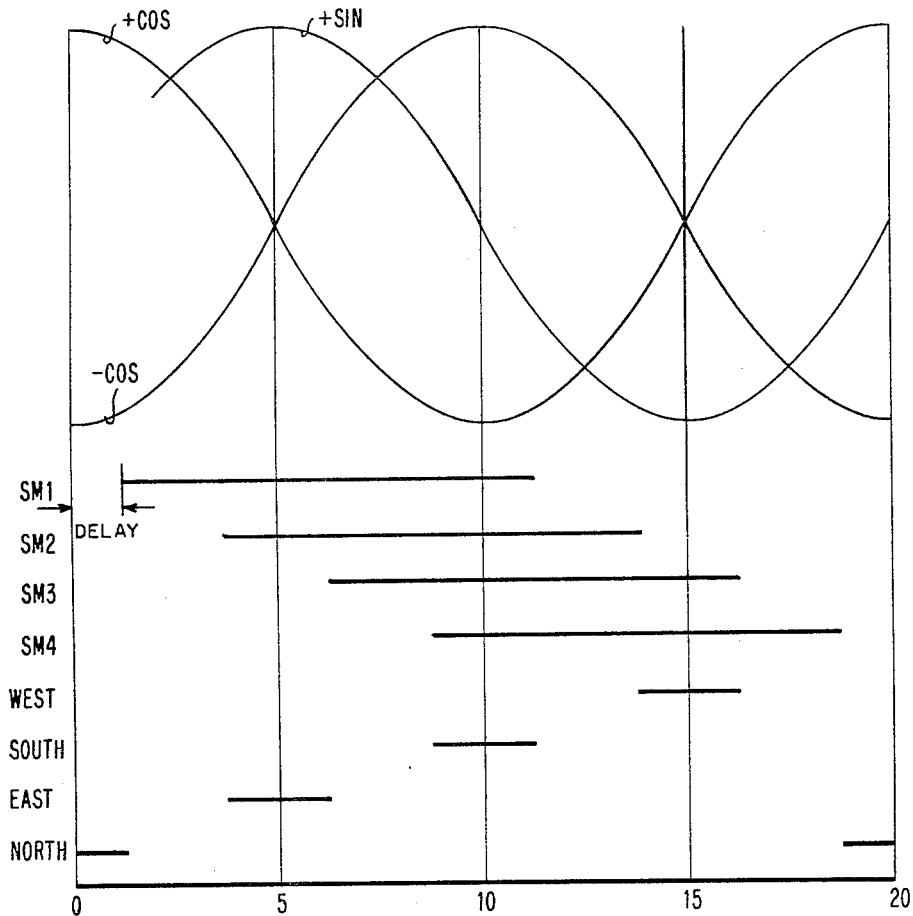
FIG. 5 is a diagrammatic illustration showing the relationship of the sine wave forms to each other and to the outputs from which the directional signals are derived.

The relationship of the deflection wave form signals, the semicircle output signals of the comparators and the resulting outputs for the four cardinal compass directions are shown in FIG. 5 of the drawings. For instance, the direction of travel will be in a generally northerly direction if neither output SM4 or SM1 is present. This corresponds with the first AND circuit shown in FIG. 3 wherein an output is provided if the inputs NT1 and NT4 are satisfied. The remaining relationships may be deduced from an examination of the drawings. The circuitry provides an indication of the phase relationships of the voltages supplied to the deflection circuits, and the various phase shifts occurring thereafter must be considered in considering the relationship between the outputs of the comparators 29, 31, 33 and 35 with respect to actual spot position and also the direction of the circle center movement. For example, if the deflection circuits 17 constitute integrating devices such that a 90° phase shift takes place between the inputs thereto and the outputs to the deflection coils or plates of the cathode ray tube 5, it will be apparent that the 90° difference between the direction of motion of the circle centers and the direction of motion of the spot, as illustrated in FIG. 2, will be indicated by the outputs of the comparators.

No specific utilization is shown herein for the directional outputs of the system, since they may be applied in a number of different ways, for example either to set up sequential circuits for determining the value of a character being traced by the curve following system in connection with the character recognition system 13 or for providing a character escape system in which the direction of motion of the spot is utilized to determine whether or not the scanning spot may have been trapped in an enclosed space for some reason and requires a special technique to remove it therefrom.

From the foregoing it will be apparent that the present invention provides an arrangement in which the direction of motion of the spot of a flying spot scanner of the curve following type employing variable radii circles in the scanning pattern may be determined by comparing the various phase relationships of the signals utilized in generating the curvilinear scanning motion to provide outputs which then may be combined in various combinatorial arrangements to indicate the direction of the spot. If the phase relationship between the deflection of the spot and the signals provided to the comparator circuits are considered, the direction of motion of the scanning circles may also be determined.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a flying spot scanner of the curve following type, including a cathode ray tube and deflection means for positioning the cathode ray tube beam to successive positions along a pattern or curve to be traced, the combination comprising
   sinusoidal voltage generator means for providing a base sinusoidal voltage of predetermined amplitude and frequency;
   phase shifting means connected to said voltage generator means for deriving a plurality of angularly related sinusoidal voltages from said base sinusoidal voltage;
   deflection circuit means connected to said phase shifting means to provide a circular type of trace by the combined action of at least two of said angularly related signals; and
   direction indicating means connected to said phase shifting means for indicating the direction of motion of the spot of the cathode ray tube including comparing means for comparing different ones of said angularly related signals with other ones of said angularly related signals to produce a plurality of digital signal values indicative of the range of motion of the spot over semicircular portions of the circular trace; and
   digital logic means for indicating selected combinations of said digital signal values indicative of specific spot motion directions.

2. Apparatus as claimed in claim 1, in which the angularly related voltages comprise the sine, the cosine and the negative cosine waveforms of said base sinusoidal voltage.

3. Apparatus as claimed in claim 1, in which the angularly related voltages are also compared with a reference voltage to produce further digital signal values.

4. Apparatus as claimed in claim 1, in which a plurality of comparison triggers are provided, the outputs of said comparing means being connected to said triggers, and means responsive to sensing the edge of a document information pattern stroke for setting said triggers to one or the other of two stable states in accordance with the presence of an output signal from the associated comparison circuit.

5. Apparatus as claimed in claim 4, in which a plurality of combinatorial logic circuits have their inputs connected to the outputs of said triggers to provide output signals indicative of particular directions in which the spot of said scanner is moving.

References Cited
UNITED STATES PATENTS

| | | | |
|---|---|---|---|
| 3,015,730 | 1/1962 | Johnson | 250—202 |
| 3,297,988 | 1/1967 | Greanias et al. | 340—146.3 |

DAVID J. GALVIN, *Primary Examiner.*